Feb. 2, 1971  W. SCHEIDLER  3,559,423
EQUIPMENT FOR WORKING ON LIQUID-FILLED CONDUITS
Filed Aug. 8, 1969  4 Sheets-Sheet 1
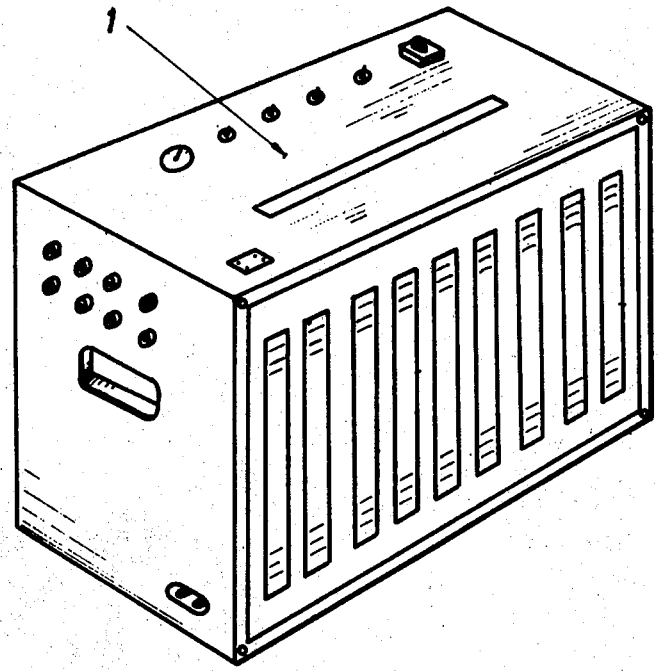
Fig. 1
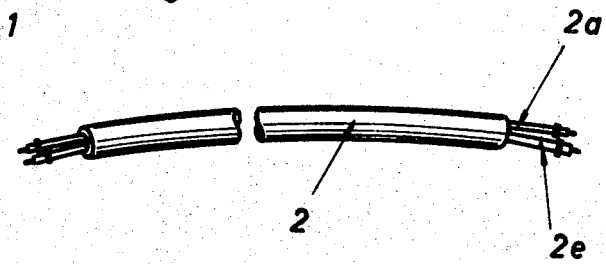
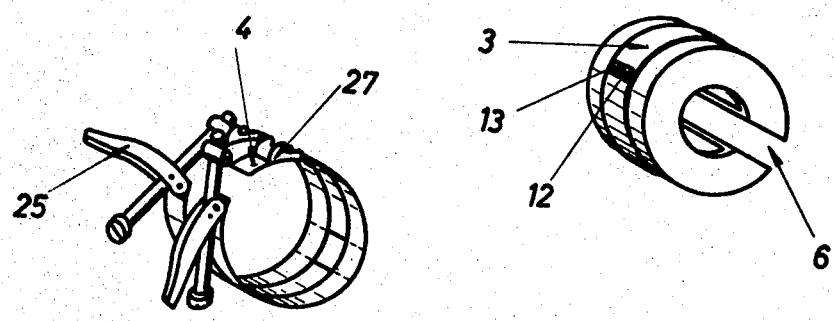
Inventor
WERNER SCHEIDLER
By Michael S. Striker
Attorney

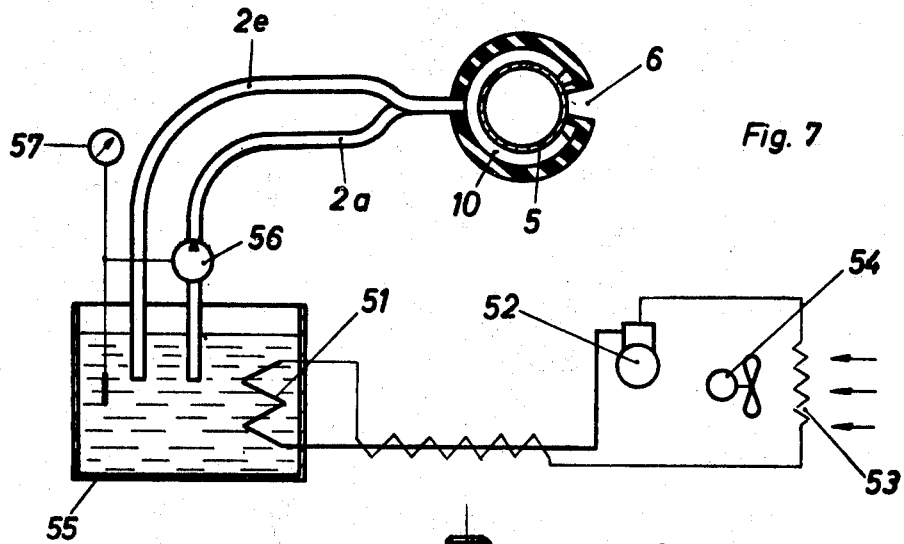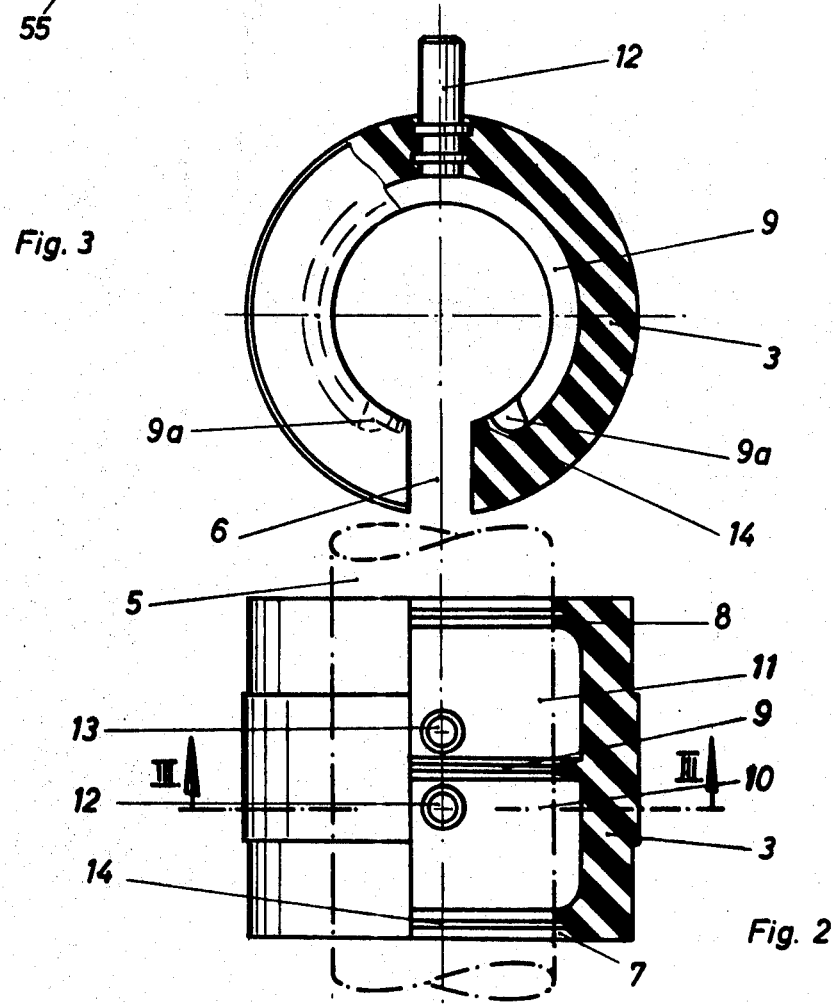

Inventor
WERNER SCHEIDLER

By Ph. Acef S.Shuker
Attorney

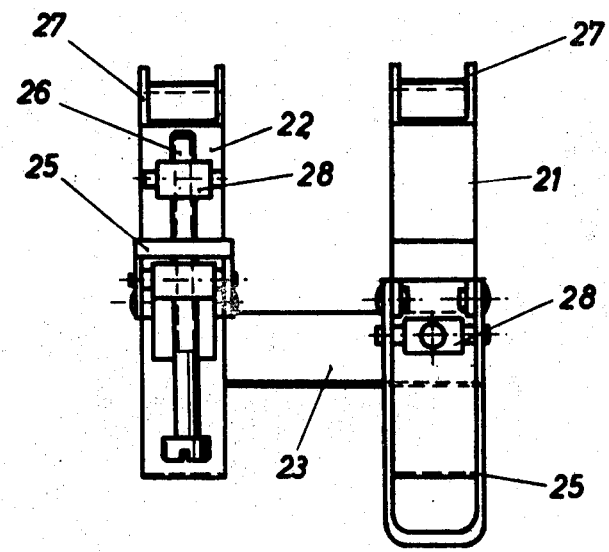
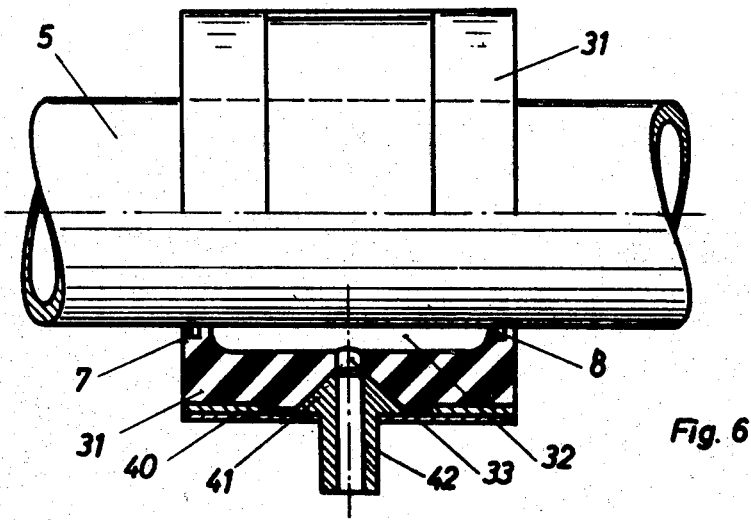
Fig. 5
Fig. 6

United States Patent Office 3,559,423
Patented Feb. 2, 1971

3,559,423
EQUIPMENT FOR WORKING ON LIQUID-FILLED CONDUITS
Werner Scheidler, Gundershausen, Germany
(24 Canerouth Drive, Etobicoke, Ontario, Canada)
Filed Aug. 8, 1969, Ser. No. 848,556
Int. Cl. F25d 3/00
U.S. Cl. 62—293                16 Claims

ABSTRACT OF THE DISCLOSURE

The apparatus according to the present invention permits working on liquid-filled pipes without having to drain them. It comprises at least one substantially annular member of elastomeric material which is placed about a pipe section and provided with inner sealing lips engaging the pipe section so as to space the inner surface of the annular member from the outer surface of the pipe section and define between them a sealed substantially annular clearance. A refrigerating unit is provided, and a refrigerant cooled by the refrigerating unit is circulated through this annular clearance to thereby freeze the liquid in the pipe section and to form in the latter an ice plug which prevents circulation of liquid through the pipe and enables work on the pipe downwstream of the ice plug without requiring draining of the liquid.

BACKGROUND OF THE INVENTION

The present invention relates generally to equipment for working on liquid-filled conduits, and more particularly to equipment enabling the execution of such work without requiring draining of the conduits.

In making repairs, alterations or the like on conduits, such as pipes which are filled with liquid, it is conventionally necessary to either drain the pipe of liquid before work can be carried out, or to close off the pipe at either side of the pipe section where the repair or other work is to be effected. Draining can of course be avoided if the pipe is provided at regular intervals with shut-off valves or the like, but the presence of such valves in liquid-carrying pipes—particularly in water pipes on domestic and other premises—is not very prevalent.

There exists, therefore, a need to provide a different solution which does not require draining of the pipe and which does not depend upon the presence of shut-off valves.

One approach which is known from the art provides a refrigeration device which is connected via suitable hoses with a sleeve member consisting of two semi-cylindrical hinged sections which are placed about the pipe section where liquid flow is to be interrupted. The two hinged parts are provided with two chambers which are connected to one another via the rather complicated hinge arrangement and the refrigerant—which must not be allowed to contact the pipe directly to avoid damage of the latter—flows into these chambers wherein it expands and thereby extracts heat from the pipe section and the water in this pipe section.

Bascially, this device performs the desired function for which it is intended. However, it has some quite serious disadvantages. On the one hand the sleeve which is to be placed about the pipe can be adapted to different pipe diameters by utilizing a series of two-part liners which must be introduced into the two parts of the basic sleeve, and this evidently reduces the heat-exchange efficiency. Furthermore, the hose connections between the sleeve and the refrigerant unit must not be connected at either end because this would result in pressure losses and render the device inoperative. Furthermore, it would also permit the agressive refrigerant to escape with the resultant danger of damage or injury. Evidently, this possibility of disconnecting the various components of the device renders the same difficult to transport and handle. Moreover, in actual use it is frequently impossible to avoid damage to the hose connections, with the result that leakage of the refrigerant occurs leading to pressure losses and/or danger of damage and injury.

SUMMARY OF THE INVENTION

It is, accordingly, an object of the present invention to provide an improved apparatus of the type in question.

More particularly it is an object of the present invention to provide such an apparatus which is not possessed of the aforementioned disadvantages.

A concomitant object of the invention is to provide an apparatus of the type in question which is capable of being utilized with pipes having a range of different diameters without requiring the use of auxiliary components for adapting the device to the different diameters.

A further object of the invention is to provide such an apparatus which is more effective than that known from the prior art.

Still another object of the invention is to provide such an apparatus which can be used readily and simply, which can be connected to and disconnected from a pipe in simple manner, and whose individual components can be disconnected from one another without danger of damage to the apparatus and/or other articles, and without fear of injury to the operator or other perons in the vicinity.

In pursuance of the above objects, and others which will become apparent hereafter, one feature of my invention resides, briefly stated, in an apparatus for temporarily freezing liquid contained in sections of liquid-filled conduits. My apparatus comprises at least one substantially annular member of elastomeric material arranged to be placed about a conduit section and having an inner surface provided with a circumferentially extending depression and with sealing portions surrounding the depression and projecting radially inwardly from the inner surface so as to engage an outer surface of the conduit section about which the member is placed. Thus, the member defines with the outer surface of the conduit sections a substantially annular clearance. Means is provided for circulating a refrigerant in this clearance to thereby freeze liquid contained in the conduit section and convert it into a plug of ice which precludes movement of liquid in the conduit.

The term "substantially annular" as employed herein indicates that the member is generally annular but not circumferentially complete. This is of course necessary in order to permit it to be placed on a conduit or pipe in direction transversely to the elongation of the latter without having to make the annular member of jointed sections and without having to slide it onto the conduit axially of the latter, because in both of these cases one of the primary considerations of the present invention would of course be defeated.

By using an elastomeric material, such as rubber or synthetic plastic material, for the substantially annular member which is placed about the conduit section in question, I obtain good retardation of heat exchange between the atmosphere and the refrigerant circulating through the annular member, and this is of course important for the effectiveness of the apparatus.

Furthermore, I utilize a refrigerant which constitutes no dangers and which in particular is not aggressive on contact with metal and is not corrosive. This permits me to circulate the refrigerant into the aforementioned annular clearance, that is into direct heat-exchanging contact with the outer surface of the pipe section, whereby heat exchange is more rapid and more effective than would otherwise be possible, for instance with the aforementioned construction according to the prior art.

My novel apparatus not only provides for significant savings in energy requirements and time, but also can be rapidly assembled and disassembled for transportation, whereby the danger of damage during transportation with resultant later improper operation is significantly reduced if not eliminated.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is an exploded view showing in somewhat diagrammatic form the various components of my novel apparatus;

FIG. 2 is a plan view, partially in axial section, of a sleeve or substantially annular member for use in my novel apparatus;

FIG. 3 is an end view of the embodiment shown in FIG. 2, partly sectioned on the line III—III of FIG. 2;

FIG. 5 is a side view of the embodiment shown in FIG. 4, illustrating the tensioning means in partially closed condition;

FIG. 6 is a view similar to FIG. 2 but illustrating a further embodiment;

FIG. 7 is a diagrammatic view of an apparatus according to the present invention.

DESCRIPTION OF THE PREFERRED EMBODIMENTS

Figure 4:
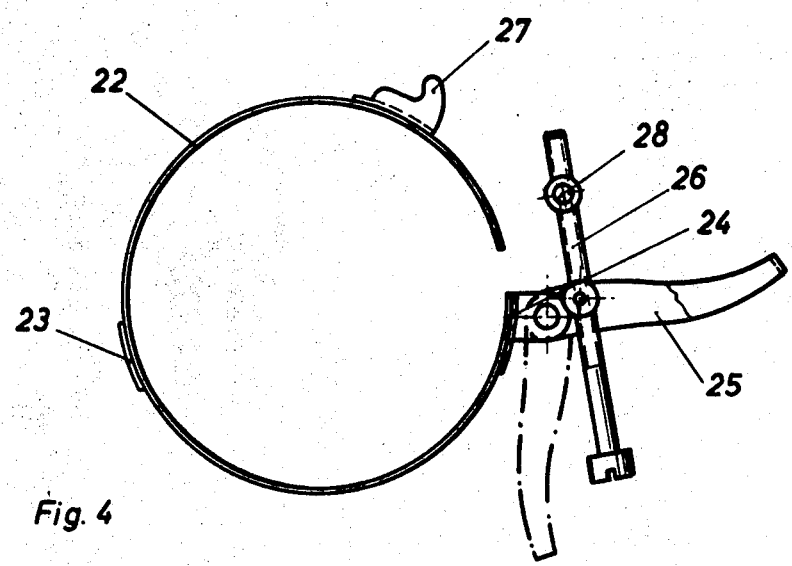
FIG. 4 shows a tensioning means for use in conjunction with the annular member of FIGS. 2 and 3, in opened condition.

Discussing firstly FIG. 1 it will be seen that this illustrates in perspective and exploded view how the apparatus according to the present invention can be disassembled. It comprises a portable box-shaped housing 1 containing a refrigeration unit of conventional construction and a receptacle for cooling or refrigerant fluid, neither of which are shown because they are known to those skilled in the art. A hose 2 comprises a supply conduit 2a and a return flow conduit 2e. The annular member is identified with reference numeral 3 and reference numeral 4 identifies a tensioning means which is to be placed about the annular member for tightening the same about a pipe section.

FIG. 7 shows diagrammatically how the individual components are assembled and how the device is used. Reference numeral 51 is a heat exchanger of a refrigerant unit having a compressor 52, a condenser 53 and a blower 54. The heat exchanger 51, the compressor 52 and the condenser 53 together define a heat-exchange or cooling circuit.

Reference numeral 55 identifies a receptacle containing a body of refrigerant and into which the heat exchanger 51 at least partially extends as illustrated. The body of refrigerant is, according to the present invention, preferably brine and thereby overcomes the objections to the refrigerant used in the previously discussed prior-art construction. A pump 56 interposed in the supply conduit 2a feeds the refrigerant from the receptacle 55, wherein it has been undercooled by the heat exchanger 51, through the supply conduit 2a into the annular space 10 included between the annular member 3 and the pipe section 5 surrounded by the latter, as will be discussed later in the detailed description of the annular member 3. After circulating through the annular space 10 the refrigerant returns through the return flow conduit 2e into the receptacle 55. A known switching thermometer 57 responds to the temperature of the refrigerant in the receptacle 55 and is operatively associated with the compressor 52—in a manner not illustrated but evident to those skilled in the art—and advantageously also with the pump 56 as shown. Thus, the compressor 52 is actuated in response to a rise of the temperature of the refrigerant in receptacle 55 above a preselected limit. It will then operate and via the heat exchanger 51 cool the refrigerant in the receptacle 55. The operative connection between the pump 56 and thermometer 57 is not mandatory but is advantageous because it can be so constructed that the pump will start to advance refrigerant from the receptacle 55 through the supply conduit 2a into the annular clearance 10 only when the thermometer indicates that a preselected temperature has been reached, that is when the refrigerant has been cooled by the heat exchanger 51 to the extent necessary to assure freezing of the liquid in the pipe section 5.

It is advantageous to use a pump 56 which operates in both directions, that is which is capable of reversal so that, when the apparatus is no longer required, refrigerant contained in the clearance 3 can be withdrawn therefrom through the conduit 2a into the receptacle 55 by the pump 56, before the member 3 is removed from the pipe section 5.

Figure 8:
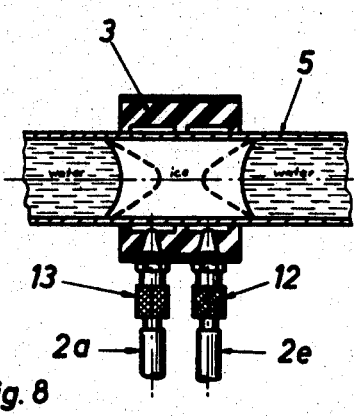
FIG. 8 is a diagrammatic view illustrating the principle of operation of the apparatus according to the present invention.

The principle of operation of the novel apparatus is diagrammatically shown in FIG. 8 wherein the reference numerals indicate like components as have been previously described already. Reference numerals 12 and 13 are the connecting nipples connecting the conduits 2a and 2e with the member 3. It is clearly evident that the water in the conduit 5—of course it could be another liquid—is frozen in the pipe section surrounded by the member 3 and forms an ice plug which prevents circulation of the water in the remainder of the pipe 5 while it is being maintained. Assuming that work is to be carried out on the pipe to the left of the ice plug shown in FIG. 8, and assuming that the existence of the illustrated ice plug does not already preclude the presence of water at the left-hand side thereof—because there is no further circulation of water coming from the right-hand side—then it is simply necessary to provide a second member 3 associated with the apparatus and placed about a pipe section to the left of that illustrated and also to the left of the area where work is to be carried out on the pipe, so that this area is located between the two ice plugs which are formed.

Discussing now FIGS. 2 and 3 it will be seen that the embodiment of the substantially annular member or sleeve shown therein is identified generally with reference numeral 3. It is shown to be placed about (compare FIG. 2) a pipe section 5 shown in phantom lines. Because the member 3 is not circumferentially complete (see FIG. 3) a gap 6 remains in which the pipe section 5 is not embraced by the member 3. FIG. 3 makes particularly clear that the member 3 is of one piece and FIG. 2 shows that it is subdivided in axial direction by a radially inwardly projecting rib or lip 9 which, together with two radially inwardly projecting ribs or lips 7 and 8 located in the region of the opposite axial ends of the member 3, defines two substantially annular clearances or chambers 10 and 11 included between the inner surface of the member 3 and the outer surface of the surrounded pipe section 5. FIG. 3 shows that the rib 9 does not extend over the entire circumferential extension of the member 3 and thus leaves openings 9a via which the chambers 10 and 11 communicate with one another. Embedded in the material of the member 3 are two connecting nipples 12 and 13, each communicating with one of the chambers 10 and 11 and suitable quick-release couplings of known construction may be provided for connecting the conduits 2a and 2e to these nipples 12 and 13, respectively.

When the member 3 is placed about a conduit 5, the lips 7, 8 and 9 abut against the outer circumferential surface of the conduit 5 and provide a sealing engagement therewith. Advantageously, grooves 14 extend along the lips 7 and 8 bisecting the same as shown in FIG. 3 into two axially spaced discrete sections. This not only increases the specific sealing pressure of the lips against the conduit 5 but also makes it possible to insert into these grooves 14 a plastic sealing material which can further increase the sealing effectiveness.

A compressing device for use with the member shown in FIGS. 2 and 3 is illustrated in FIGS. 4 and 5. In this embodiment the device comprises two elastic metal ring members 21 and 22 which are connected with one another by a portion 23. A member 24 substantially U-shaped section is secured—as by welding—to each of the members 22 near one end thereof, as shown for instance in FIG. 4, and between the arms of the U-shaped member 24 there is located and secured a bolt 26 which in this embodiment is constructed as a screw. A second hook-shaped member 27 is secured to the member 22 near the opposite end thereof, and an engagement portion 28, adjustably threaded onto the bolt 26, can be engaged behind the hook of the member 27 so that, when the lever 25 is moved from the solid-line position in FIG. 4 to the phantom-line position, circumferentially directed tension will be applied whereby the member 22 is drawn together and exerts radially inwardly directed pressure upon the member 3 about which it is placed exteriorly thereof. The members 22 and 21, of which the latter is constructed in the same manner as the former, are so spaced by the portion 23 that they each overlie the member 3 exteriorly thereof in the region of the outer lips 7, 8. The pressure exerted by the compressing means 4, that is by the members 21 and 22 thereof, can be regulated by the extent to which the member 28 is threaded onto the bolt 26.

The embodiment in FIG. 6, finally, differs from the embodiment described in FIGS. 2–4 in that the connecting nipples 12, 13 of FIGS. 2 and 3 which there were embedded in the material of the member 3, are here provided in the compressing means. Specifically, the substantially annular member is here identified with reference numeral 31 and provided with only one internal annular clearance 32, that is it is not subdivided as by the rib 9 in FIGS. 2 and 3. The lips 7 and 8, however, are of course provided. The member 31 in FIG. 6 is provided with inlet and outlet openings 33 which are located proximal to the edges of the gap 6 which is shown more clearly in FIG. 3. They extend simply through the material of the member 31.

The compressing means in FIG. 6 is here constituted from a flexible metal tape and identified with reference numeral 40. It has substantially or exactly the width of the axial extension of the member 31 and is provided with openings each of which accommodates a connecting nipple 42 (only one shown) for the conduits 2a and 2e which are shown in FIG. 1. Each of the connecting nipples is provided with a tapering portion 41 located at the inwardly directed side of the ribbon 40, and the apertures 33 diverge in outward direction so that, when the ribbon 40 is placed about the outer side of the member 31, the portions 41 will become lodged in the diverging sections of the apertures 33 to provide for automatic alignment of the nipples 42 with the apertures 33. At the same time, the compression exerted by the ribbon 40 effects a sealing engagement between the portions 41 and the material of the member 31 in the region of the divergent part of the apertures 33.

The cross-sectional configuration of the member 3 or 31 is so selected that it can be used with pipes of a variety of different sizes, the range of such sizes being determined by the initial selection of the cross-sectional configuration and by the yielding ability of the elastomeric material of the member 3 or 31. If the range of pipe diameter is significantly greater than the range which can be encompassed, then a set of members 3 or 31 can be used having different wall thicknesses but having an outer diameter which is always identical and corresponds to the outer diameter which can be accommodated by the compressing means being utilized. Thus, the sections can be inserted in whatever combination may be necessary into the compressing means without, if the compressing means is of the type shown in FIG. 6, having to change the fittings, that is the nipples 42, or having to disconnect the conduits 2a and 2e. A complete change, that is not only of the members 3 or 31 but also of the compressing means for them, is necessary only if the diameter differences of the conduits with which the apparatus is to be used are excessively large from those for which the device is intended.

It will be understood that each of the elements described above, or two or more together, may also find a useful application in other types of constructions differing from the types described above.

While the invention has been illustrated and described as embodied in an apparatus for working on liquid-filled conduits, it is not intended to be limited to the details shown, since various modifications and structural changes may be made without departing in any way from the spirit of the present invention.

I claim:

1. An apparatus for temporarily freezing liquid contained in sections of liquid-filled conduits, comprising at least one substantially annular member of elastomeric material arranged to be placed about a conduit section, said member having an inner surface provided with a circumferentially extending depression, and sealing portions surrounding said depression and projecting radially inwardly from said inner surface so as to engage an outer surface of a conduit section about which said member is placed, whereby said member defines with said outer surface of said conduit section a substantially annular clearance; and means for circulating a refrigerant through said clearance to thereby freeze liquid in said conduit section and convert it into a plug of ice which precludes movement of liquid in said conduit.

2. An apparatus as defined in claim 1, wherein said sealing portions are sealing lips.

3. An apparatus as defined in claim 1; and further comprising at least one divider portion projecting radially inwardly from said inner surface intermediate said sealing portions and subdividing said clearance into at least two chambers.

4. An apparatus as defined in claim 3, said divider portion having at least one opening communicating with both of said chambers.

5. An apparatus as defined in claim 1; and further comprising compressing means surrounding said member exteriorly thereof and compressing the same radially so as to effect tight engagement of said sealing portion with said conduit section.

6. An apparatus as defined in claim 5, wherein said compressing means comprises a collar of elastic material, and tightening means for tightening said collar.

7. An apparatus as defined in claim 6, wherein said sealing portions comprise two sealing lips located at opposite axial sides of said depression and extending in circumferential direction; said compressing means comprising two annular sections each overlying said member exteriorly thereof in the region of one of said sealing lips, and connecting sections connecting said annular section to one another against relative movement.

8. An apparatus as defined in claim 1, wherein said elastomeric material is rubber.

9. An apparatus as defined in claim 1, wherein said elastomeric material is a synthetic plastic material.

10. An apparatus as defined in claim 1, said means comprising a source of flowable refrigerant, and supply and return conduits; and further comprising coupling means on said member connecting said supply and return conduits with the source and establishing communication between said supply and return conduits and said annular clearance.

11. An apparatus as defined in claim 5, said means comprising a source of refrigerant and supply and return conduits; said compressing means comprising a compressing collar surrounding the outer surface of said member, and said member having two apertures extending from said outer surface to said inner surface and communicating with said clearance; and coupling means for connecting said supply and return conduits to said collar and having openings each arranged to register with one of said apertures, said collar being constructed and arranged for establishing seal-tight communication between the respective registering apertures and openings when said member is radially compressed by said collar.

12. An apparatus as defined in claim 11, said sealing portions including two sealing lips located at opposite axial sides of said depression, and said collar including two annular sections each overlying said member in the region of one of said sealing lips, and at least one connecting section extending between and connecting said anular section; and wherein said couplig means is provided in said connecting section.

13. An apparatus as defined in claim 1, said means including a source of flowable refrigerant, and conduit means connecting said source with said clearance.

14. An apparatus as defined in claim 13, said source comprising a refrigerant circuit containing said flowable refrigerant and including said conduit means, pump means operative for circulating said refrigerant in said refrigerant circuit, and heat-exchange means associated with said refrigerant circuit for cooling the refrigerant being circulated therein.

15. An apparatus as defined in claim 14, said heat-exchange means including a refrigerating unit, a heat-exchange unit associated with said refrigerant circuit, and pipe means connecting said units and containing a cooling fluid which circulates between said units.

16. An apparatus as defined in claim 15, said refrigerant circuit including a vessel containing a body of said refrigerant, and said heat-exchange unit being located at least in part in said vessel so as to effect heat exchange between said body of refrigerant and said cooling fluid circulating through said heat-exchange unit.

References Cited

UNITED STATES PATENTS

| | | | |
|---|---|---|---|
| 2,483,082 | 9/1949 | Young | 138—97 |
| 2,572,555 | 10/1951 | Young | 62—293 |

FOREIGN PATENTS

| | | | |
|---|---|---|---|
| 586,226 | 3/1947 | Great Britain | 62—64 |

WILLIAM J. WYE, Primary Examiner

U.S. Cl. X.R.

138—97